(12) United States Patent
Kobayashi

(10) Patent No.: US 7,409,838 B2
(45) Date of Patent: Aug. 12, 2008

(54) REDUCING CORROSION AND PARTICULATE EMISSION IN GLASSMELTING FURNACES

(75) Inventor: Hisashi Kobayashi, Putnam Valley, NY (US)

(73) Assignee: Praxair Technology, Inc., Danbury, CT (US)

(*) Notice: Subject to any disclaimer, the term of this patent is extended or adjusted under 35 U.S.C. 154(b) by 387 days.

(21) Appl. No.: 11/033,514

(22) Filed: Jan. 12, 2005

(65) Prior Publication Data
US 2006/0150677 A1 Jul. 13, 2006

(51) Int. Cl.
*C03B 5/16* (2006.01)
*C03B 5/167* (2006.01)

(52) U.S. Cl. .......... 65/134.4; 65/134.1; 65/136.3; 110/343

(58) Field of Classification Search ........ 65/134.1, 65/134.4, 134.6; 110/343
See application file for complete search history.

(56) References Cited

U.S. PATENT DOCUMENTS

| | | | |
|---|---|---|---|
| 4,531,973 A | | 7/1985 | Nixon |
| 4,575,394 A | * | 3/1986 | Nixon ............... 75/414 |
| 4,634,461 A | | 1/1987 | Demarest, Jr. et al. |
| 5,107,517 A | | 4/1992 | Lauren |
| 5,578,094 A | | 11/1996 | Brooker et al. |
| 5,628,808 A | * | 5/1997 | Jantzen .................. 65/27 |
| 5,628,809 A | | 5/1997 | Kobayashi |
| 5,741,556 A | * | 4/1998 | Taylor et al. ........... 427/453 |
| 5,807,418 A | * | 9/1998 | Chamberland et al. ... 65/134.4 |
| 5,924,858 A | | 7/1999 | Tuson et al. |
| 6,253,578 B1 | * | 7/2001 | Kobayashi et al. ...... 65/134.4 |
| 6,368,104 B1 | * | 4/2002 | Saxena et al. .......... 432/138 |
| 6,789,396 B2 | | 9/2004 | Olin-Nunez et al. |
| 7,168,269 B2 | * | 1/2007 | Simpson et al. ........ 65/134.6 |

* cited by examiner

*Primary Examiner*—Eric Hug
*Assistant Examiner*—DeMaris R. Wilson
(74) *Attorney, Agent, or Firm*—Donald T. Black

(57) ABSTRACT

A glassmelting furnace is heated by combustion of fuel having an atomic ratio of hydrogen to carbon of 0.9 or less.

12 Claims, No Drawings

REDUCING CORROSION AND PARTICULATE EMISSION IN GLASSMELTING FURNACES

FIELD OF THE INVENTION

The present invention relates to the manufacture of glass.

BACKGROUND OF THE INVENTION

In the manufacture of glass, glassmaking materials are provided into a glassmelting furnace and melted into molten glass which is then poured into molds to produce products such as, for example, glass bottles. The glassmaking materials for soda-lime-silicate glass include sand, soda ash, lime, and batch oxidizers such as salt cake (calcium sulfate, $CaSO_4$) and/or niter (sodium nitrate, $NaNO_3$, and/or potassium nitrate, $KNO_3$) in order to control the redox state of the glass.

The glassmaking materials are melted in the furnace by heat provided by the combustion of fuel and oxidant. Water vapor resulting from the combustion reacts with alkali oxides in the molten glass to form alkali hydroxides which vaporize out from the molten glass. These alkali hydroxides, such as sodium hydroxide, NaOH, react with furnace refractory walls and cause refractory corrosion, and also react in flue passage (s) from the furnace with sulfur dioxide, $SO_2$, and oxygen to form sodium sulfate, $Na_2SO_4$, and other sulfate and sulfite compounds which form particulates and often require expensive electrostatic precipitators or baghouses to ensure that they are not emitted to the atmosphere.

Accelerated corrosion is experienced in silica refractory bricks in the crown of glassmelting furnaces that are converted to oxy-fuel firing (i.e. combustion in which the oxidant has a higher, often much higher, oxygen content than that of air). In particular, severe loss of silica crown is observed in some glassmelting furnaces such as in glass melting for TV panels. It is generally believed that the main cause of the accelerated corrosion is the higher concentrations associated with oxy-fuel firing.

In oxy-fuel firing nitrogen contained in the combustion air is largely absent, so the volume of the combustion products is typically reduced to $1/3$ to $1/4$ of that of the combustion products of conventional air firing. Thus the concentrations of alkali species would increase three to four times, if the same amount of volatile alkali species are generated in conventional air firing.

Accelerated corrosion shortens the furnace life and results in costly furnace repairs. In addition, corrosion increases glass defects in some glass tanks due to dripping of slag into the glass bath. Corrosion resistant refractory bricks such as alumina and alumina-zirconia-slica (AZS) bricks have been used to alleviate this corrosion. For example, AZS is often used for the side walls and flue port walls of glass furnaces, to control the corrosion problems. Silica bricks are the most widely used refractory material for the crown of furnaces because they are lighter, less heat-conductive, and substantially less expensive than alumina and AZS bricks. Also, there is concern that increased glass defects caused by zirconia "refractory stones" might occur when AZS is used for the crown. When silica is used as the material that makes up the crown of the furnace, corrosion, which causes dripping of slag into the glass bath, does not necessarily result in glass defects. This is because silica is the main composition of glass.

It would be very desirable to provide a glassmelting method wherein silica bricks can be used to line the crown of the furnace under oxy-fuel firing and wherein volatilization of alkali species is reduced to minimize corrosion of the crown and emissions of particulates.

BRIEF SUMMARY OF THE INVENTION

The advantages of the invention are provided in a glassmelting method which reduces alkali corrosion in a glassmelting furnace with oxy-fuel burners comprising:
(A) providing glassmaking materials including alkali species into the glassmelting furnace;
(B) providing fuel and oxidant into the furnace through the oxy-fuel burners wherein the atomic ratio of hydrogen to carbon in the fuel provided through one or more of the oxy-fuel burners is less than 0.9; and
(C) combusting the fuel and oxidant therein to provide heat to the glassmaking materials to form molten glass.

As used herein, "glassmelting materials" comprise any of the following materials, and mixtures thereof: sand (mostly $SiO_2$), soda ash (mostly $Na_2CO_3$), limestone (mostly $CaCO_3$ and $MgCO_3$), feldspar, borax (hydrated sodium borate), other oxides, hydroxides and/or silicates of sodium and potassium, and glass (such as recycled solid pieces of glass) previously produced by melting and solidifying any of the foregoing.

As used herein, "oxy-fuel burner" means a burner through which are fed fuel and oxidant having an oxygen content greater than the oxygen content of air, and preferably having an oxygen content of at least 50 volume percent and more preferably more than 90 volume percent.

As used herein, "oxy-fuel combustion" means combustion of fuel with oxidant having an oxygen content greater than the oxygen content of air, and preferably having an oxygen content of at least 50 volume percent and more preferably more than 90 volume percent.

DETAILED DESCRIPTION OF THE INVENTION

The invention is carried out in a glassmelting furnace of any effective design. Typically the glassmelting furnace has a bottom and sides which define in the interior of the furnace a chamber for holding molten glass. The particular shape of the bottom is not critical, although in general practice it is preferred that at least a portion of the bottom is planar and is either horizontal or sloped in the direction of the flow of the molten glass through the furnace. All or a portion of the bottom can instead be curved. The particular shape of the furnace as defined by its sides is also not critical, so long as the sides are high enough to hold the desired amount of molten glass. The furnace also has an entrance, commonly known as "dog house", typically in a wall at one end of the furnace, through which glassmaking materials or molten glass flows into the furnace, and an exit, commonly known as "throat", typically in a wall at the end of the furnace opposite the wall containing the entrance, through which molten glass can flow out of the furnace. The furnace will also have a roof, also referred to as the crown. There are also one or more flues through which products of the combustion of fuel and oxygen can flow out of the interior of the furnace. The flue or flues are typically located in the crown, or high in one or more walls.

The bottom, sides and crown of the furnace should be made from refractory material that can retain its solid structural integrity at the temperatures to which it will be exposed, i.e. typically 1300 to 1700 degrees C. Such materials are widely known in the field of construction of high-temperature apparatus. Examples include silica, fused alumina, and AZS.

The glassmaking furnace is also equipped with one or more burners, one or more of which are oxy-fuel burners. Preferably, for ease of construction, ease of operation and satisfactory control of the operations, all of the burners are oxy-fuel burners. However, if desired, air-fired burners can be present as well.

The oxy-fuel burners are arranged so that the flames they support are in the interior of the furnace, above the surface of the molten glass. Typically the burners can be located in one or more walls of the furnace (by which is meant the sides, the wall adjacent the point of entry of glassmaking materials into the furnace, and the wall adjacent the point of exit of molten glass from the furnace). Burners can be oriented so that the axis of the flames they support extend inward parallel to the surface of the molten glass, or so that the flames extend from the burner in a direction toward the surface of the molten glass. Combinations of different orientations can also be employed. Preferred examples include providing equal numbers of burners in each of the side walls of a furnace, facing each other or staggered. The burners can all be at the same height above the top surface of the molten glass, or the heights can be varied to provide a different distribution of the heat of combustion.

Each oxy-fuel burner is arranged so that oxidant and fuel are fed from suitable sources outside the furnace, into and through the burner so that fuel and oxidant emerge from the burner (separately or mixed) in the interior of the furnace where they combust and generate heat to melt the glassmaking materials and maintain the glassmelt in the molten state.

The oxidant fed to the oxy-fuel burners is gaseous and should have a higher oxygen content than air, i.e. higher than 22 volume percent, but the preferred oxygen content of the oxidant is at least 50 volume percent and more preferably at least 90 volume percent. Thus, oxygen-enriched air can be employed as the oxidant, as can higher purity oxygen produced on site or purchased from a commercial supplier.

The fuel should contain carbon, hydrocarbons or other compounds containing both hydrogen and carbon, at an atomic ratio of hydrogen to carbon (the "H/C ratio") of not more than 0.9 which distinguishes the fuel from fuels conventionally used for these purposes such as natural gas or fuel oil. Preferably the H/C ratio is 0.6 or less, and more preferably 0.4 or less.

The benefits of the invention can be realized in any burners in which the H/C ratio of the fuel fed to the burner (including any transport gas, as discussed below) is not more than 0.9. In one preferred embodiment, all the burners that are operating in the glass furnace are fed fuel having a H/C ratio of not more than 0.9. In other preferred embodiments, burners that operate in the relatively hotter regions of the glass furnace are fed fuel at a H/C ratio of not more than 0.9, and other burners operating in the same glass furnace are fed fuel having a H/C ratio greater than 0.9.

Among gaseous fuels CO (carbon monoxide) is most preferred, but it is not readily available in quantities and at locations, making its regular use as a fuel uneconomic for most glass furnaces. Syngas with a low $H_2/CO$ mole ratio is an alternative. For example syngas can be produced by partially oxidizing petroleum coke or coal with oxygen and $CO_2$ or steam in an on-site plant located in a glass plant. Byproduct gases that contain carbon monoxide, such as refinery gases, off gas from a basic oxygen steelmaking furnace, blast furnace gas and coke oven gas from integrated steel mills, could be used, if the hydrogen content (including gaseous $H_2$ and atomic hydrogen bound in other molecules) is sufficiently low. However, piping relatively low Btu byproduct gases to glass plants may not be economic. Flue gas, that is, gaseous products of the combustion in the glass furnace, can be recycled and used as fuel in mixture with other combustible substances.

Solid fuels suitable for use in this invention include petroleum cokes, coal chars, and low ash high carbon coals. Among different coals, higher rank coals typically have lower H/C ratios. The H/C atomic ratios of anthracites, bituminous coals, sub-bituminous coals, and lignites are about 0.26-0.56, 0.64-0.85, 0.82-0.86; and 0.76-0.91 respectively. Cokes and chars are residual products of thermal processes (i.e., pyrolysis) of carbonaceous materials and have low hydrogen contents. Petroleum coke is a solid material with a high carbon content that is produced as a by-product of the oil refining process and remains after products such as kerosene, diesel and jet fuels, gasoline, heating oil and asphalt are recovered from crude oil. Petroleum coke is often available as a low cost fuel and typically has H/C ratios of between 0.3 and 0.7 depending on the content of volatile matter. Coal and petroleum coke typically have ash contents of 5-20% and 0.1-1% respectively by weight. For use in glass melting furnaces, fuels with low ash contents are preferred to lessen the risk that ash in the fuel would mix into the glassmelt and influence the glass quality as well as to lessen the risk of refractory corrosion by ash deposition. Thus, petroleum coke is a preferred fuel of this invention.

When the fuel is gaseous, it is simply fed through conventional piping from its source into and through the oxy-fuel burner. The gaseous fuel and the oxidant are fed through the burner at rates relative to each other so that the amount of oxygen fed is 100% to 120% of the stoichiometric amount needed for complete combustion of the fuel.

When the fuel is solid, such as petroleum coke, it should have an average particle size small enough to facilitate its being fed in mechanical conveyors or mixed and carried in a flowing stream of transport gas, and to facilitate its combustion owing to the high ratio of surface area to mass. Thus, in general, the solid fuel should be pulverized in an appropriate conventional pulverizer to an average particle size of, for example, 70% minus 200 mesh. Pulverizing equipment suitable for this task is familiar and readily available in the solid fuel combustion field.

The particles of solid fuel are then fed into and through the oxy-fuel burner. Preferably, the fuel is fed in a flowing stream of transport gas. Air is one suitable transport gas and is of course readily available. The amount of air or another transport gas required to transport pulverized coke or coal is typically about 0.3 to 1 pound of transport gas per pound of fuel. However, the use of air as the transport gas would increase the nitrogen concentration in the furnace significantly and lead to increased amounts of nitrogen oxides in the combustion gases. It is thus preferred to use a transport gas that contains less nitrogen than air does. Preferably the transport gas contains less than 10% nitrogen in volume. Oxygen is not recommended as a transport gas as its mixture with the fuel presents a potential explosion hazard. Natural gas or other gaseous fuel such as syngas containing low nitrogen is a preferred transport gas for the solid fuel. Recycled flue gas from the glassmelting furnace (which preferably has been cooled to a temperature below its temperature upon exiting the glass furnace) is also a preferred transport gas for the solid fuel. Steam or $CO_2$ can be used as well. However, steam is not a preferred transport gas as it would increase the $H_2O$ concentration in the furnace. In cases in which a portion of the transport gas is combustible, the H/C atomic ratio of the combination of the fuel and the transport gas should be not more than 0.9.

The solid fuel and the oxidant are typically fed through separate passages through the burner at rates relative to each other so that the total amount of oxygen fed is 100% to 120% of the stoichiometric amount needed for complete combustion of the solid fuel. However, if the solid fuel is fed with transport gas any portion of which is combustible, then the oxidant and the fuel in such transport gas should be fed at rates relative to each other so that the amount of oxygen fed is 100% to 120% of the stoichiometric amount needed for complete combustion of both the fuel and the combustible portion of the transport gas. Conversely if the solid fuel is fed with transport gas containing oxygen such as air, then the amount of main oxidant fed separately through the burner should be reduced so that the amount of the total oxygen fed is 100% to 120% of the stoichiometric amount needed for complete combustion of the fuel.

As is well known, the number of burners, their location in the glassmelting furnace, and the amount of fuel fed into and combusted within the furnace (which provides the amount of heat of combustion) are determined by conventional design by the size of the furnace and the amount of material to be molten in it.

The present invention provides numerous advantages.

One significant advantage is that alkali-mediated corrosion of the interior surfaces of the furnace, especially the silica crown, is significantly reduced. Without intending to be bound by any particular theory of explanation, corrosion of the refractory silica surfaces in an oxy-fuel glass furnace is believed to be caused mainly by NaOH vapor in the furnace which is formed by the reactive volatilization of the $Na_2O$ in glass and $H_2O$ in the furnace atmosphere. The rate of silica crown corrosion would accordingly be reduced by reducing the NaOH concentration in the furnace atmosphere. The present invention reduces the concentration of $H_2O$ in the furnace atmosphere, thereby reducing the rate of formation and volatilization of NaOH.

More specifically, oxy-fuel combustion of a fuel with a low H/C ratio leads to a much lower $H_2O$ concentration in the furnace atmosphere compared to the result of oxy-fuel combustion of fuel with a higher H/C ratio, such as natural gas. For example, the $H_2O$ concentration in the products of oxy-fuel combustion of petroleum coke with a H/C ratio of 0.3 is about 13%, whereas in a natural gas oxygen fired furnace, the theoretical $H_2O$ concentration with 2% excess $O_2$ is about 65%. (The effects of $CO_2$ and $H_2O$ evolved from the decomposition of the glassmaking materials is neglected in these calculations.) Thus, applying the appropriate equations for mass-transfer-controlled reaction equilibria, the equilibrium vapor pressure of NaOH at the glassmelt surface is reduced in the present invention by about a factor of 2 (=the square root of 65/17).

Another significant advantage of the present invention is that particulate emissions from the furnace are also reduced significantly. Such particulates are believed to comprise predominantly $Na_2SO_4$ and to be formed by reaction of volatilized NaOH in the furnace atmosphere with sulfur oxides. Thus, the reduction in the formation of NaOH in the furnace atmosphere, provided by the practice of the present invention, also reduces this pathway to formation of particulate materials.

The present invention is also easy to install in existing glassmaking facilities. Many glass melting furnaces have been converted to oxy-gas firing during major furnace repairs and the capacity, number and placement of oxy-fuel burners are well known to those skilled in the art. And providing suitable feeds of fuel and oxygen is also well-known and conventional in this field.

The present invention would not be expected to present problems in operation or in the quality of the glass product. The typical ash content of petroleum coke is 0.2-0.8% and the main metallic impurities are typically vanadium (5 to 5000 ppm), iron (50-2000 ppm) and/or nickel (10-3000 ppm). They are not likely to create glass quality issues for most glasses as most of theses species would be volatilized and escape the furnace with flue gas. Moreover, with the present invention, oxygen firing is used without regenerators, so corrosion concerns relating to the regenerators are avoided.

As petroleum coke may typically contain 2 to 8% sulfur, emissions of gaseous sulfur oxides (SOx) might have to be dealt with (although for the reasons stated above, emissions of sulfate particulates would not be expected to be a problem). A scrubbing system may be needed to capture SOx emissions. One way to limit SOx emissions is to employ oxy-fuel combustion in only some of the burners of the glassmelting furnace, while using air-fired burners in the remainder of the burners of the furnace. In such partial conversions, it is preferred to use fuel with a low H/C ratio in furnace areas where alkali volatilization is most severe. The hot spot of the furnace or the zone near the highest crown temperature is where alkali volatilization is most severe. Thus, it is preferred to use a low hydrogen fuel in the hotter zone of the furnace while firing the rest of the furnace with a conventional fuel such as natural gas or oil. In glass furnaces producing high quality glasses, however, the use of solid fuel firing near or downstream of the fining zone might influence the color of the glass due to reactions of glassmelt and ash and unburned carbon. In such a case it is preferred to use a fuel with a H/C atomic ratio of 0.9 or less in the charge end of the furnace while firing the rest of the furnace with a conventional fuel such as natural gas or oil.

Employing coal in the present invention when the glass product is intended for use as clear containers may require additional measures to remove contaminants from the combustion products. In coal firing, typical ash content is about 5 to 10% and the concentrations of trace transition metals appear significant for container glass due to the glass color specificatios. Assuming 100% capture of the coal ash in the glassmelt, the transition metals could be iron (100 to 1000 ppm), titanium (10-100 ppm), cobalt, nickel, vanadium, chromium, manganese, copper (0.1-2 ppm). For wool fiber glass furnaces, however, discoloration would not be an issue.

Any concerns that combusting coke or coal in the glass furnace could affect the redox charge of the glass product due to unburned carbon in ash can be easily addressed. (In coal-air combustion in boilers, 1 to 10% unburned carbon in the ash (UBC) is common. If the same level of UBC is found in a glassmelting furnace, it could theoretically introduce about 0.2 to 2 lb of carbon per ton of glass.) While the redox of glass can be compensated by adding batch oxidizers (typically, niter and sulfates), it is preferred to have nearly complete combustion of the carbon in the fuel. Nearly complete combustion can readily be achieved in this invention. With oxy-fuel combustion UBC is expected to be reduced significantly since the furnace temperature of glassmelting is very high, and, especially since the typical gas residence in an oxy-fuel fired glass furnace is about 30 seconds, as compared with 2 seconds in a coal-air fired boiler.

Further furnace design improvements to reduce alkali volatilization from glassmelt surface can be combined with the present invention. For example, the crown can be elevated to a height such as 5.5 to 9 feet above the upper surface of the molten glass, especially in conjunction with positioning the burners in the walls of the furnace at heights 1.5 to 3 feet above the upper surface of the molten glass.

It is also advantageous to employ low momentum burners, by which is meant burners in which the oxidant is fed at a velocity of less than 300 ft/sec, preferably less than 150 ft/sec, more preferably less than 75 ft/sec and the fuel is fed at a velocity of less than 600 ft/sec, preferably less than 300 ft/sec, more preferably less than 150 ft/sec.

The preferred furnace atmosphere condition is to have $H_2O$ concentration less than 40% near the molten glass surface, more preferably less than 25% and most preferably less than 15%. This can be achieved with the present invention and especially in conjunction with other techniques for attaining low $H_2O$ concentrations near the glassmelt surface.

For example, it is also advantageous to inject one or more layers of gas proximate the surface of the molten glass, to protect the molten glass surface from adverse reaction with the contiguous atmosphere. The atmosphere can be oxidizing, obtained by establishing a layer of oxygen or oxygen-enriched air between the molten glass surface and the flames that are supported by the burners. The atmosphere can be reducing, obtained by establishing a layer gaseous hydrocarbon(s) in the space between the molten glass surface and the flames that are supported by the burners.

The aforementioned techniques are described in U.S. Pat. No. 5,628,809, U.S. Pat. No. 5,924,858 and U.S. Pat. No. 6,253,578, the disclosures of which are hereby incorporated herein by reference.

What is claimed is:

1. A glassmelting method which reduces alkali corrosion in a glassmelting furnace with oxy-fuel burners comprising:
   (A) providing glassmaking materials including alkali species into the glassmelting furnace;
   (B) providing fuel and oxidant into the furnace through the oxy-fuel burners wherein the fuel provided through one or more of the oxy-fuel burners contains carbon, hydrocarbons, or otter compounds containing both hydrogen and carbon and wherein the atomic ratio of hydrogen to carbon in said fuel provided through said one or more of the oxy-fuel burners is Less than 0.9; and
   (C) combusting the fuel and oxidant therein to provide heat to the glassmaking materials to form molten glass.

2. The method of claim 1 wherein the atomic ratio of hydrogen to carbon in said fuel provided through said one or more of the oxy-fuel burners is less than 0.6.

3. The method of claim 1 wherein the atomic ratio of hydrogen to carbon in said fuel provided through said one or more of the oxy-fuel burners is less than 0.4.

4. The method of claim 1 wherein said fuel comprises carbon monoxide.

5. The method of claim 1 wherein said fuel containing carbon, hydrocarbons, or other compounds containing both hydrogen and carbon, comprises petroleum coke.

6. The method of claim 1 wherein said fuel containing carbon, hydrocarbons, or other compounds containing both hydrogen and carbon is solid.

7. The method of claim 6 wherein said fuel containing carbon, hydrocarbons, or other compounds containing both hydrogen and carbon is injected into the furnace in mixture with transport gas which contains less than 10% nitrogen in volume.

8. The method of claim 6 wherein said fuel containing carbon, hydrocarbons, or other compounds containing both hydrogen and carbon is injected into the furnace with transport gas at least a portion of which is cooled flue gas from said glassmelting furnace.

9. The method of claim 1 wherein the atomic ratio of hydrogen to carbon in the fuel provided through all of the oxy-fuel burners is less than 0.9 and said fuel contains carbon, hydrocarbons, or other compounds containing both hydrogen and carbon.

10. The method of claim 1 wherein said one or more oxy-fuel burners provided with said fuel with the atomic ratio of hydrogen to carbon of less than 0.9 are placed in the hotter area of the furnace and other oxy-fuel burners in said glassmelting furnace are fired with a fuel with the atomic ratio of hydrogen to carbon of greater than 0.9.

11. The method of claim 1 wherein said one or more oxy-fuel burners provided with said fuel with an atomic ratio of hydrogen to carbon of less than 0.9 are placed in the charge end of the furnace and other oxy-fuel burners in said glassmelting furnace are fired with a fuel with an atomic ratio of hydrogen to carbon of greater than 0.9.

12. The method claim 1 wherein said fuel containing carbon, hydrocarbons, or other compounds containing both hydrogen and carbon is provided through said one or more oxy-fuel burners in mixture with transport gas at least a portion of which is combustible, and the atomic ratio of hydrogen to carbon in the mixture of said fuel and transport gas is less than 0.9.

* * * * *